Aug. 7, 1934.     R. R. SANDERSON     1,969,040
DRILL BIT
Filed July 30, 1932

INVENTOR
Ray R. Sanderson
BY Evans & McCoy
ATTORNEYS

Patented Aug. 7, 1934

1,969,040

UNITED STATES PATENT OFFICE 1,969,040

DRILL BIT

Ray R. Sanderson, Orrville, Ohio

Application July 30, 1932, Serial No. 626,903

7 Claims. (Cl. 255—63)

This invention relates to a drill bit blade and removable bit tip assembly for use in churn and percussion drilling, and more particularly to an assembly wherein the cutting face of the drill bit tip is provided with replaceable and reversible corner members.

In my co-pending application Serial No. 614,866 filed on June 2, 1932, I have disclosed a single piece drill bit tip removably securable to a drill bit blade and designed to replace the usual form of heavy, conventional drill bits commonly used in churn and percussion drilling. The invention herein set forth is an improvement on drill bits of this general character, although it may be used in any suitable character of drill bit.

Removable cutting parts for drill bits have been proposed heretofore, but because of their fragile character arising from weaknesses in the structure of the bit tip itself or in the method of holding the cutting parts in place, they have proved unsatisfactory in percussion or churn drilling.

This invention provides an improved form of drill bit with removable cutting elements that may be replaced when worn and that are of such rugged construction that the drill bit may be used in percussion and churn drilling. A drill bit tip embodying this invention also has inserted cutting elements that can be reversed in order to most effectively use all parts of the cutting faces of the drill.

An object of the present invention is to provide a drill bit tip for use in churn and percussion drilling which may be releasably secured at the end of a drill bit blade and which carries removable corner members firmly embedded within the body of the drill bit tip and which members may be inverted end for end as wear occurs.

Another object is to provide a drill bit tip having reversible and replaceable corner members closely and properly seated over a large arcuate area within the body of the drill bit tip.

Another object is to provide a drill bit tip having replaceable corner members designed and positioned to maintain the constant gauge of the drill tool so that a drill hole of constant diameter will result.

Another object is to provide a drill bit blade and drill bit tip assembly in which the cutting blade of the drill bit tip consists of separate corner members formed of tungsten steel of great hardness which corner members are removably and reversibly secured within apertures formed therefor in the drill bit tip.

A further object of the invention is to provide a drill bit tip for percussion and churn drilling wherein the cutting element is protected by abutting shoulder portions that permit maximum penetration of the cutting edge and also prevent injury to the cutting edge from excessive drilling stresses.

A further object is to provide a drill bit tip having replaceable corner members which greatly prolong the life of the bit tip so that one bit tip mounting for such corner members may serve as a mounting for other corner members.

Another object of the present invention is to provide a removable drill bit tip which has a much longer life than drill bit tips previously proposed.

Another object is to provide a drill bit tip having separate corner members which may be quickly and easily assembled with the drill bit tip.

A further object is to provide a drill bit tip having separate and replaceable corner members which are inexpensive to manufacture and require a minimum of machine operations to finish.

An additional object of the invention is to provide an improved locking stud and dowel for securing the bit tip corners in place.

With the above and other objects in view, which will be readily apparent from the following detailed description, the present invention consists in certain constructions and combinations of parts, which will be readily understood by those skilled in the art to which the invention appertains.

In the accompanying drawing, which illustrates a suitable embodiment of the present invention, Figure 1 is a side elevation partly in section of a drill bit blade and bit assembly in which reversible corner members are positioned within said drill bit tip in secured relation thereto;

Figure 1:
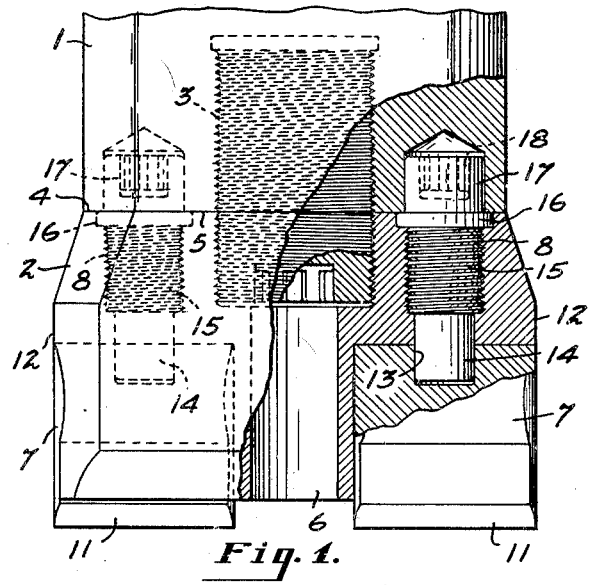
Figure 2:
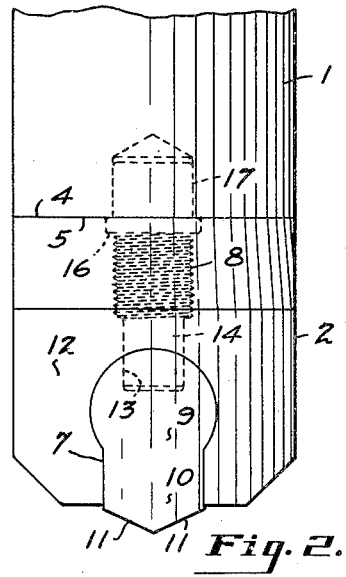
Fig. 2 is a side elevation of the bit tip and blade assembly shown in Fig. 1 and taken at right angles thereto.
Figure 3:
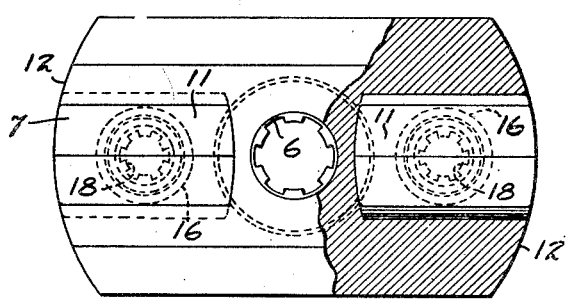
Fig. 3 is a bottom plan view, partly in section, of a drill bit tip showing a replaceable corner member in mounted position.
Figure 4:
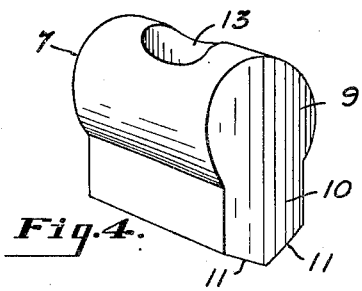
Fig. 4 is a view in perspective of a drill bit tip corner member removed from the drill bit tip.

The structure shown in Fig. 1 to Fig. 4 comprises a drill bit blade 1 to which a bit tip 2 is secured by the anchor stud 3 or other suitable means.

A suitable stud-receiving aperture, disposed centrally and longitudinally of the drill bit blade forms a socket for one end of the anchor stud 3. Dowel-receiving apertures are preferably disposed upon opposite sides of the stud-receiving socket to form sockets for the dowel portions of locking studs to be described. An impact face 4 is formed on the lower extremity of the bit blade and is substantially perpendicular to the axis of the drill bit blade and bit tip assembly.

The drill bit tip has an impact face 5 that engages the impact face 4 of the drill bit blade. A stud-receiving aperture disposed centrally of the drill bit tip forms a suitable socket for one end of the anchor stud 3 and opens downwardly into a wrench-receiving aperture 6 formed through the drill bit tip. Each end of the drill bit tip is suitably apertured to receive a replaceable corner member 7 that is secured in place by a suitable locking stud 8. Each of the corner members 7 makes a very close working fit with the apertured bit tip.

The corner members 7 are preferably identical and each is formed with a cylindrical body portion 9 and a blade portion 10 that are closely and accurately seated within the aperture formed in the bit tip. Inclined rock crushing faces 11 are formed at the proper angle with each other to provide a suitable cutting edge. Each end of the corner member is rounded to conform to the general contour of the ends or wear faces 12 of the drill bit tip. A suitable aperture 13 is formed centrally of the cylindrical body portion of each corner member for receiving the locking stud, 8.

The combined locking stud and dowel 8 preferably consists of a pin 14 which seats within, but which does not contact with, the bottom of the aperture 13 formed in the corner member. The threaded portion 15 of the locking stud 8 engages within the drill bit tip 2 and serves to seat and hold the pin 14 within the aperture 13 of the corner member. The collar portion 16 is preferably positioned above the threaded portion 15 and its sides form a very close mechanical fit within the aperture formed within the drill bit tip so that the collar 16 may assume the major portion of the laterally directed stresses to which the locking stud 8 is subjected when the bit tip is subjected to stresses tending to spin the bit. A dowel portion 17 formed on the upper end of the locking stud engages within the aperture formed in the drill bit blade and functions to prevent the rotation of the drill bit tip with respect to the drill bit blade when in assembled relation. The dowel portion preferably carries a suitable wrench connection, such as the internally splined wrench socket 18 shown in the drawing.

Figure 5:
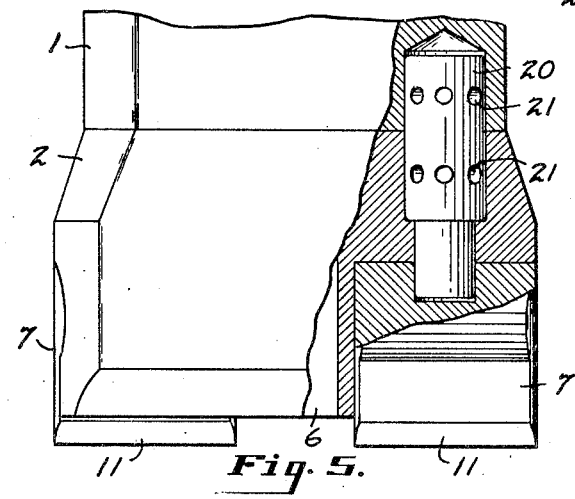
Fig. 5 is an elevational view partially in section of a drill bit blade and bit tip assembly using a modified form of locking stud for securing a removable and reversible corner member into position within the bit tip.

A modified form of combined anchor stud and dowel pin 20 in the form of a simple, unthreaded plug is shown in Fig. 5 of the drawing. In this construction a tight fit is afforded and suitable wrench-gripping sockets 21 may be provided if desired for forcibly removing the tight fitting combination stud and locking pin from its aperture in either the bit blade or bit tip in which it is tightly seated.

Figure 6:
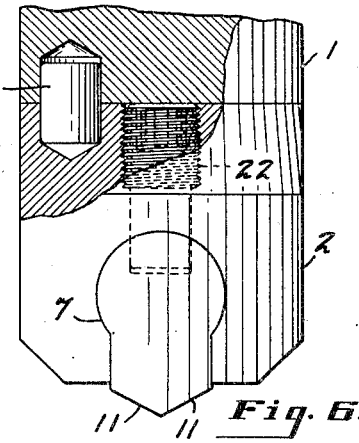
Fig. 6 is an elevational view, partly in section, of another modified form of locking stud used to secure the removable and replaceable drill bit tip corner member in position.

A further modification of the anchor stud is shown in Fig. 6. The stud 22 serves to secure the bit tip corner member 7 in position. In this construction separate dowel pins 23 serve to prevent movement of the drill bit tip with respect to the drill bit blade.

The drill bit corner member 7 is mounted within the drill bit tip 2 by sliding it longitudinally of the drill bit tip into the aperture formed in the end thereof. The locking stud 8 is then inserted and screwed down into position so that the pin 14 forming the lower extremity thereof is positioned within the aperture 13 formed centrally in the upper face of the corner member. The bit tip is then mounted on the bit blade, as described in my co-pending application above referred to.

Reversal of either or both of the bit tip corners 7 is accomplished by removing the bit tip from the bit blade, removing the locking stud to release the corner member which may then be reversed or replaced by a new corner member that is substituted for the one worn in service. The locking stud may then be replaced and the drill bit tip remounted upon the drill bit blade and the drill tool is again ready for service.

The drill bit tip forming the subject matter of the present invention in which the corners are replaceable and reversible is particularly adapted for highly abrasive rock formations, for the softer rock formation, and for earth drilling. This form of bit tip materially decreases the operating costs of drill bit tips. The drill bit tips that serve as a mounting for the reversible and replaceable corner members are of a very hard material, preferably of nickel file steel, and because of its structure and method of mounting, it has very long life in service.

The replaceable and reversible corner members are preferably formed of tungsten steel and are shaped and positioned within the drill bit tip in such manner as to assume the burden of the actual rock-crushing operations of the bit tip. Because of the fact that with each impact the bit corner is driven toward the middle of the bit tip, the structure disclosed herein is particularly well adapted for prolonged service and provides a commercially strong and successful product. A suitable clearance is provided below the pin seating within the aperture 13 formed in each corner member for relieving the threaded portion from vertically directed stresses resulting from the drop of the bit in the hole. The substantially cylindrical shape of the upper portion of each corner member provides an even distribution of both the vertically and the horizontally directed forces necessarily transmitted from each corner member to the bit tip. The curved end portions of each corner member maintain the drilled hole at a uniform gauge throughout its depth. The cutting or rock-crushing faces of the corner members are shaped to provide the proper angularity and sharpness for the greatest strength and cutting advantage for each formation.

The collar 16 forming a part of the locking stud 7 assumes all transverse stresses to which the locking stud and the dowel 17 are subjected and this collar should fit very closely within its aperture.

It is to be understood that the particular embodiments of the invention shown and described are presented for purposes of illustration and explanation and that various modifications in the shape of the drill bit tip and in the manner of arranging the parts of the drill bit assembly and in other particulars may be made without departing from the invention as defined in the appended claims.

What I claim is:

1. A drill bit assembly, comprising a drill bit blade having an anchor stud-receiving socket and a dowel-receiving socket offset from said anchor stud-receiving socket, a drill bit tip having an anchor stud-receiving socket registering with the anchor stud-receiving socket formed in the drill bit blade and a locking-pin-receiving socket offset from said anchor socket and registering with the dowel socket of said blade, said drill bit tip having corner member-receiving apertures formed therein with shoulder portions overhanging said corner member-receiving apertures, a removable bit tip corner member having a body portion closely seating within the corner member-receiving aperture formed in said bit tip and having a downwardly extending exposed cutting face, said corner member also having a locking member aperture formed in the body portion thereof and indexing with the locking socket of said bit tip, a combination dowel and locking anchor stud seating within said locking anchor stud socket formed in said bit tip and having a locking portion extending into the locking aperture formed in said corner member and having a dowel portion extending into the dowel-receiving aperture formed in said bit blade, and an anchor stud threaded within the socket formed in said bit blade and the socket formed in said bit tip for anchoring the said bit blade and bit tip together.

2. A drill bit assembly, comprising a drill bit blade having an anchor stud-receiving socket and an offset socket, a drill bit tip having an anchor stud-receiving socket registering with said anchor-stud-receiving socket formed in said bit blade, said bit tip also having a socket offset from said anchored stud socket and registering with said offset socket in said bit blade, said bit tip having a corner member-receiving aperture formed with shoulder portions overhanging said aperture, a removable bit tip corner member having a body portion closely seating within said corner member aperture and having a downwardly extending, exposed cutting blade, and means engaged in said offset sockets for removably securing said corner member in seated relation with said bit tip and for preventing relative rotative movement of said bit tip with respect to said bit blade.

3. A drill bit assembly, comprising a drill bit blade, a drill bit tip having a central aperture and a corner member receiving aperture, separate means disposed within both said bit tip and said bit blade for joining said bit tip to said bit blade and operable through said central aperture, a reversible corner member removably positioned within said corner member receiving aperture, and a corner member securing means carried by said bit tip and projecting into said bit blade and into said corner member for retaining said corner member in secured position within the corner member receiving aperture of said bit tip.

4. A drill bit assembly, comprising a drill bit blade, a drill bit tip having a central aperture and a corner member receiving aperture, a pair of opposed overhanging shoulder portions of said bit tip forming part of said corner member receiving aperture, separate means disposed within both said bit tip and said bit blade for joining said bit tip to said bit blade and operable thru said central aperture, a reversible corner member removably positioned within said corner member receiving aperture, a body portion of said corner member abutting against the shoulder portions of said bit tip, a rock cutting blade forming a part of said corner member and rigidly supported on each side by said bit tip, means positioned within said bit tip and projecting into said corner member for retaining said corner member in secured position within the corner member receiving aperture in the bit tip, and means positioned within said bit tip and projecting into said bit blade for preventing relative rotary movement therebetween.

5. A drill bit assembly, comprising a drill bit blade, an impact face forming the lower extremity of said bit blade and disposed substantially normal to the longitudinal axis thereof, a drill bit tip having a central aperture and a corner member receiving aperture, an impact face forming a part of said bit tip and contacting the impact face of said bit blade, separate means disposed within both said bit tip and said bit blade for joining said bit tip to said bit blade and operable thru said central aperture, a reversible corner member removably positioned within said corner member receiving aperture, a rock cutting blade forming a part of said corner member, and a corner member securing means making threaded engagement with said bit tip and projecting into both said bit blade and said corner member for retaining said corner member in secured position within the corner member receiving aperture in said bit tip and for preventing relative rotary movement between said bit tip and said bit blade.

6. A drill bit assembly, comprising a drill bit blade, an impact face forming a part of said bit blade, a drill bit tip having a central aperture and a corner member receiving aperture, an impact face forming a part of said bit tip, separate means disposed within both said bit tip and said bit blade for joining the bit tip to the bit blade and operable thru said central aperture, a reversible corner member removably positioned within said corner member receiving aperture, a corner member securing means making engagement with said bit tip and projecting into said bit blade and into said corner member for retaining said corner member in secured position within the corner member receiving aperture in said bit tip, and an outwardly extending collar portion forming a part of said corner member securing means and positioned within said bit tip adjacent the impact face thereof.

7. A drill bit assembly, comprising a drill bit blade, a drill bit tip having a central aperture and a corner member receiving aperture, separate means disposed within both said bit tip and said bit blade for joining said bit tip to said bit blade and operable thru said central aperture, separate means disposed inwardly of both the bit blade and the bit tip for preventing relative rotary movement therebetween and offset from said central aperture, a reversible corner member removably positioned within said corner member receiving aperture, a corner member securing means disposed inwardly of both said bit tip and said corner member and making threaded engagement with said bit tip for retaining said corner member in secured position within the corner member receiving aperture in said bit tip, and wrench engaging means integral with said corner member securing means and disposed inwardly of said bit tip.

RAY R. SANDERSON.